(12) United States Patent
Itoh et al.

(10) Patent No.: US 11,747,720 B2
(45) Date of Patent: Sep. 5, 2023

(54) LIGHT SOURCE MODULE AND PROJECTOR

(71) Applicant: Seiko Epson Corporation, Tokyo (JP)

(72) Inventors: Yoshitaka Itoh, Matsumoto (JP); Hiroyasu Kaseya, Fujimi (JP)

(73) Assignee: SEIKO EPSON CORPORATION

( * ) Notice: Subject to any disclaimer, the term of this patent is extended or adjusted under 35 U.S.C. 154(b) by 174 days.

(21) Appl. No.: 16/941,681

(22) Filed: Jul. 29, 2020

(65) Prior Publication Data

US 2021/0033956 A1 Feb. 4, 2021

(30) Foreign Application Priority Data

Jul. 30, 2019 (JP) ................................ 2019-139485

(51) Int. Cl.
*G02B 27/28* (2006.01)
*G03B 21/20* (2006.01)

(52) U.S. Cl.
CPC ....... *G03B 21/2033* (2013.01); *G02B 27/283* (2013.01); *G02B 27/286* (2013.01); *G03B 21/2073* (2013.01)

(58) Field of Classification Search
CPC ............ G03B 21/2033; G03B 21/2073; G02B 27/283; G02B 27/286
See application file for complete search history.

(56) References Cited

U.S. PATENT DOCUMENTS

| | | | | |
|---|---|---|---|---|
| 5,161,042 A * | 11/1992 | Hamada | ................. | G03B 33/12 349/95 |
| 6,072,628 A * | 6/2000 | Sarayeddine | ........ | G02B 27/283 359/833 |
| 6,206,532 B1 * | 3/2001 | Hawes | ................. | H04N 5/7441 359/489.09 |
| 8,164,180 B2 * | 4/2012 | Sato | .................... | B81C 1/00301 438/106 |

(Continued)

FOREIGN PATENT DOCUMENTS

| | | | |
|---|---|---|---|
| JP | 2004-087917 A | 3/2004 | |
| JP | 2006-003817 A | 1/2006 | |

(Continued)

*Primary Examiner* — Fatima N Farokhrooz
(74) *Attorney, Agent, or Firm* — Harness, Dickey & Pierce, P.L.C.

(57) ABSTRACT

A light source module includes a light emitting element having a resonator formed of a photonic crystal structure, and a polarization conversion element, wherein the polarization conversion element includes a polarization split layer that reflects first polarized light toward a first direction, and transmit second polarized light toward a second direction, a reflecting layer that reflects the first polarized light, toward the second direction, and a retardation layer which is disposed in a light path of one of the first polarized light and the second polarized light, and converts the one of the first polarized light and the second polarized light into another of the first polarized light and the second polarized light, the resonator has a resonant part, and in a plan view, a length of the resonant part in the first direction is shorter than a length (Continued)

of the resonant part in a third direction perpendicular to the first direction and the second direction.

2 Claims, 6 Drawing Sheets

(56) References Cited

U.S. PATENT DOCUMENTS

| | | | | |
|---|---|---|---|---|
| 8,337,020 | B2* | 12/2012 | Handschy | G02B 27/283 |
| | | | | 353/20 |
| 2004/0109329 | A1* | 6/2004 | Kato | H04N 9/315 |
| | | | | 362/555 |
| 2005/0220402 | A1* | 10/2005 | Takagi | G02F 1/011 |
| | | | | 385/129 |
| 2009/0168392 | A1* | 7/2009 | Chen | G03B 21/208 |
| | | | | 362/19 |
| 2010/0245691 | A1* | 9/2010 | Kawamura | G03B 21/2073 |
| | | | | 349/9 |
| 2011/0051093 | A1* | 3/2011 | Qu | G03B 21/2073 |
| | | | | 353/20 |
| 2018/0217487 | A1* | 8/2018 | Yasuda | G03B 21/2073 |

FOREIGN PATENT DOCUMENTS

| | | | | | |
|---|---|---|---|---|---|
| JP | 2006-133601 | A | | 5/2006 | |
| JP | 2013182207 | A | * | 9/2013 | ........... G02B 27/283 |
| JP | 2015079079 | A | * | 4/2015 | ......... G02B 27/1046 |
| JP | 2018031815 | A | * | 3/2018 | |
| JP | 2018124487 | A | * | 8/2018 | ........... G02B 27/283 |
| JP | 2018133516 | | * | 8/2018 | |
| WO | WO-2013062932 | A1 | * | 5/2013 | ........... G02B 27/102 |

* cited by examiner

LIGHT SOURCE MODULE AND PROJECTOR

The present application is based on, and claims priority from JP Application Serial Number 2019-139485, filed Jul. 30, 2019, the disclosure of which is hereby incorporated by reference herein in its entirety.

BACKGROUND

1. Technical Field

The present disclosure relates to a light source module and a projector.

2. Related Art

There is known a liquid crystal projector which uses a liquid crystal display element as a light modulation element. In the liquid crystal projector, since polarized light is necessary when displaying an image, it is desirable for a light source of the liquid crystal projector to be capable of emitting light high in polarization degree.

In JP-A-2006-133601, for example, as a light source of the liquid crystal projector, there is described a light source which splits unpolarized light emitted from a light emitting element into S-polarized light and P-polarized light in a polarization beam splitter, converts one of the S-polarized light and the P-polarized light into the other thereof in a ½ wave plate, and then emits the result.

As a light emitting element constituting such a light source of the liquid crystal projector as described above, there is studied a photonic crystal light emitting element having a photonic structure. Photonic crystal light emitting element resonates light in a resonant part of a resonator constituted by the photonic crystal structure. The photonic crystal light emitting element is capable of emitting a laser beam which has a narrow light distribution angle, and is uniform in light emission intensity.

From a viewpoint of a heat dissipation performance, in the photonic crystal light emitting element, in a plan view, it is preferable to provide the resonant part with a shape having a longitudinal direction and a short-side direction such as a rectangular shape instead of a square. This is because the rectangular shape is higher than the square in the proportion of the outer circumferential length per light emission area, and is therefore advantageous to heat dissipation.

However, when providing the rectangular shape to the resonant part of the photonic crystal light emitting element, the light distribution angle becomes different between directions perpendicular to each other. For example, in the resonant part having long sides in an X-axis direction and short sides in a Y-axis direction, the light distribution angle in the Y-axis direction of outgoing light becomes larger than the light distribution angle in the X-axis direction of the outgoing light. When the light distribution angle increases, the S-polarized light and the P-polarized light cannot correctly be separated from each other in the polarization beam splitter in some cases.

SUMMARY

A light source module according to an aspect of the present disclosure includes at least one light emitting element having a resonator formed of a photonic crystal structure, and a polarization conversion element which light emitted from the light emitting element enters, wherein the polarization conversion element includes a polarization split layer configured to reflect first polarized light out of incident light toward a first direction, and transmit second polarized light out of incident light toward a second direction perpendicular to the first direction, a reflecting layer configured to reflect the first polarized light reflected by the polarization split layer, toward the second direction, and a retardation layer which is disposed in a light path of one of the first polarized light reflected by the reflecting layer and the second polarized light transmitted through the polarization split layer, and converts the one of the first polarized light and the second polarized light into another of the first polarized light and the second polarized light, the resonator has a resonant part, and in a plan view viewed from the second direction, a length of the resonant part in the first direction is shorter than a length of the resonant part in a third direction perpendicular to the first direction and the second direction.

In the light source module according to the aspect described above, a plurality of the light emitting elements may be disposed, and the light emitted from the plurality of the light emitting elements may enter the polarization conversion elements.

The light source module according to the aspect described above may further include a base member, a lid member, and a frame member configured to couple the base member and the lid member to each other, wherein the light emitting element may be disposed in a space formed by the base member, the lid member, and the frame member, and the polarization conversion element may constitute the lid member.

The light source module according to the aspect described above may further include a base member, a lid member, and a frame member configured to couple the base member and the lid member to each other, wherein the light emitting element may be disposed in a space formed by the base member, the lid member, and the frame member, the lid member may be formed of a light transmissive substrate configured to transmit the light emitted from the light emitting element, and the polarization conversion element may be disposed on a surface on an opposite side to the light emitting element with respect to the lid member.

A projector according to another aspect of the present disclosure includes the light source module according to any of the aspects described above.

DESCRIPTION OF EXEMPLARY EMBODIMENTS

Some preferred embodiments of the present disclosure will hereinafter be described in detail using the drawings. It should be noted that the embodiments described hereinafter do not unreasonably limit the contents of the present disclosure as set forth in the appended claims. Further, all of the constituents described hereinafter are not necessarily essential elements of the present disclosure.

1. First Embodiment

1.1. Light Source Module
1.1.1. Configuration

Figure 1:
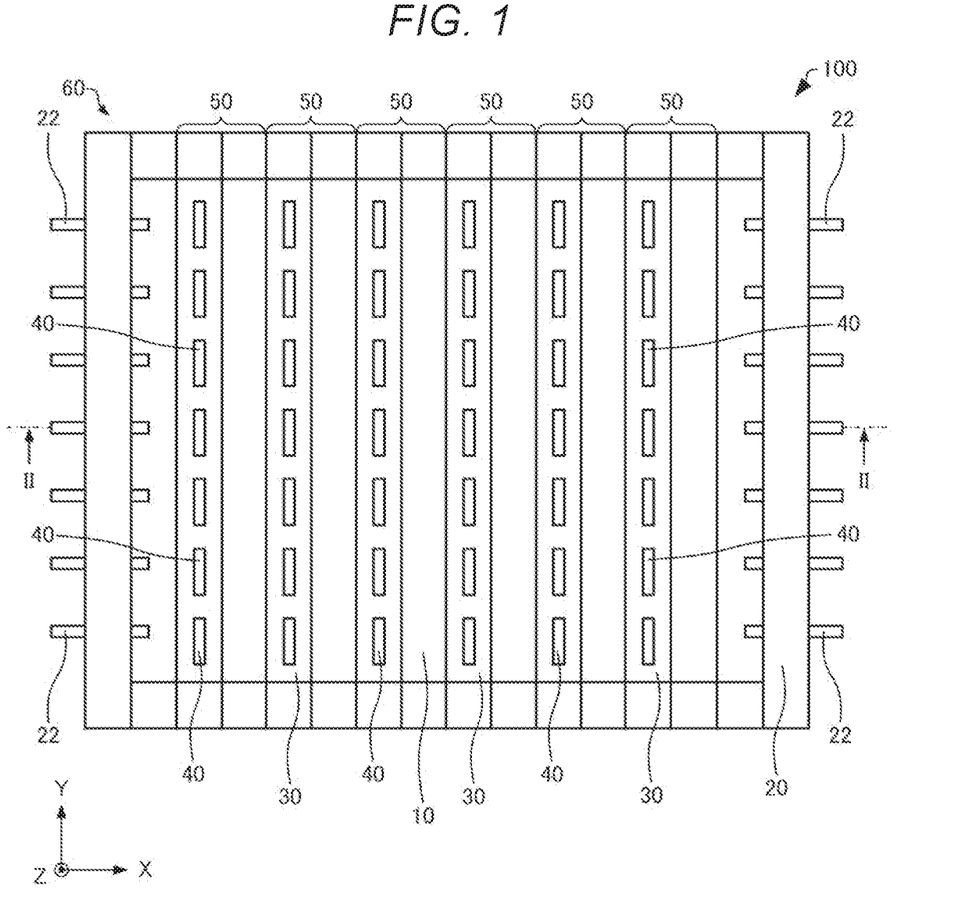
FIG. 1 is a plan view schematically showing a light source module according to a first embodiment.
Figure 2:
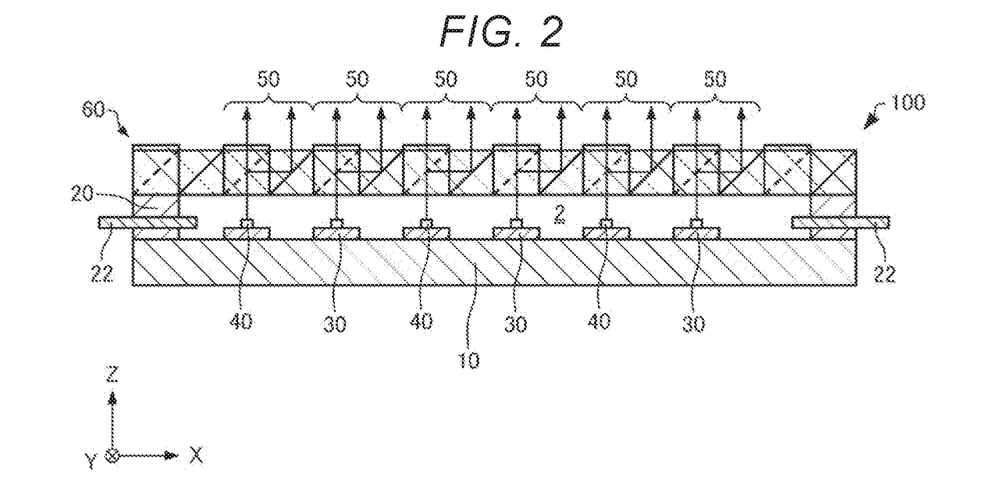
FIG. 2 is a cross-sectional view schematically showing the light source module according to the first embodiment.

Firstly, a light source module according to a first embodiment will be described with reference to the drawings. FIG. 1 is a plan view schematically showing a light source module 100 according to the first embodiment. FIG. 2 is a cross-sectional view along the line II-II shown in FIG. 1, and schematically shows the light source module 100 according to the first embodiment. It should be noted that in FIG. 1 and FIG. 2, an X axis, a Y axis, and a Z axis are shown as three axes perpendicular to each other.

As shown in FIG. 1 and FIG. 2, the light source module 100 has, for example, a base member 10, a frame member 20, sub-mounts 30, light emitting elements 40, and polarization conversion elements 50.

The base member 10 is, for example, a plate-like member. It is preferable for the base member 10 to be high in thermal conductivity. Thus, it is possible to release the heat generated in the light emitting elements 40. The material of the base member 10 is, for example, copper, kovar (an alloy obtained by combining nickel and cobalt with iron), or aluminum nitride.

As shown in FIG. 2, the frame member 20 connects the base member 10 and the polarization conversion element 50 to each other. The frame member 20 is disposed along the outer circumference of the base member 10 in a plan view (hereinafter also referred to simply as "in the plan view") viewed from the Z-axis direction. It is preferable for the thermal expansion coefficient of the frame member 20 to be approximate to the thermal expansion coefficient of the polarization conversion element 50. Thus, it is possible to reduce the stress caused in the light source module 100 by a difference in thermal expansion coefficient between the frame member 20 and the polarization conversion element 50. The material of the frame member 20 is, for example, kovar.

The frame member 20 is provided with terminals 22. In the illustrated example, the terminals 22 each penetrate the frame member 20 in the X-axis direction. The terminals 22 are electrically coupled to the light emitting elements 40 via interconnections not shown.

The sub-mounts 30 are disposed on the base member 10. The sub-mounts 30 are respectively disposed between the base member 10 and the light emitting elements 40. The plurality of sub-mounts 30 are disposed so as to correspond to the plurality of light emitting elements 40. In the illustrated example, the plurality of sub-mounts 30 are arranged in the X-axis direction.

It is preferable for the sub-mounts 30 to be high in thermal conductivity. Thus, it is possible to release the heat generated in the light emitting elements 40. It is preferable for the thermal expansion coefficient of the sub-mounts 30 to be approximate to the thermal expansion coefficient of the base member 10 and the thermal expansion coefficient of the light emitting elements 40. Thus, it is possible to reduce the stress caused in the light source module 100 by a difference in thermal expansion coefficient between the sub-mounts 30 and the base member 10, and a difference in thermal expansion coefficient between the sub-mounts 30 and the light emitting elements 40. The material of the sub-mounts 30 is, for example, aluminum nitride or aluminum oxide.

The light emitting elements 40 are respectively disposed on the sub-mounts 30. The number of the light emitting elements 40 disposed is at least one. In the illustrated example, there are disposed the plurality of light emitting elements 40. The plurality of light emitting elements 40 are arranged in a matrix in the X-axis direction and the Y-axis direction. In the example shown in FIG. 1, the plurality of light emitting elements 40 are disposed in each of the sub-mounts 30, and the plurality of light emitting elements 40 are arranged in the Y-axis direction. It should be noted that although not shown in the drawings, it is also possible to dispose one light emitting element 40 in one sub-mount 30. Here, FIG. 3 is a perspective view schematically showing the light emitting element 40.

Figure 3:
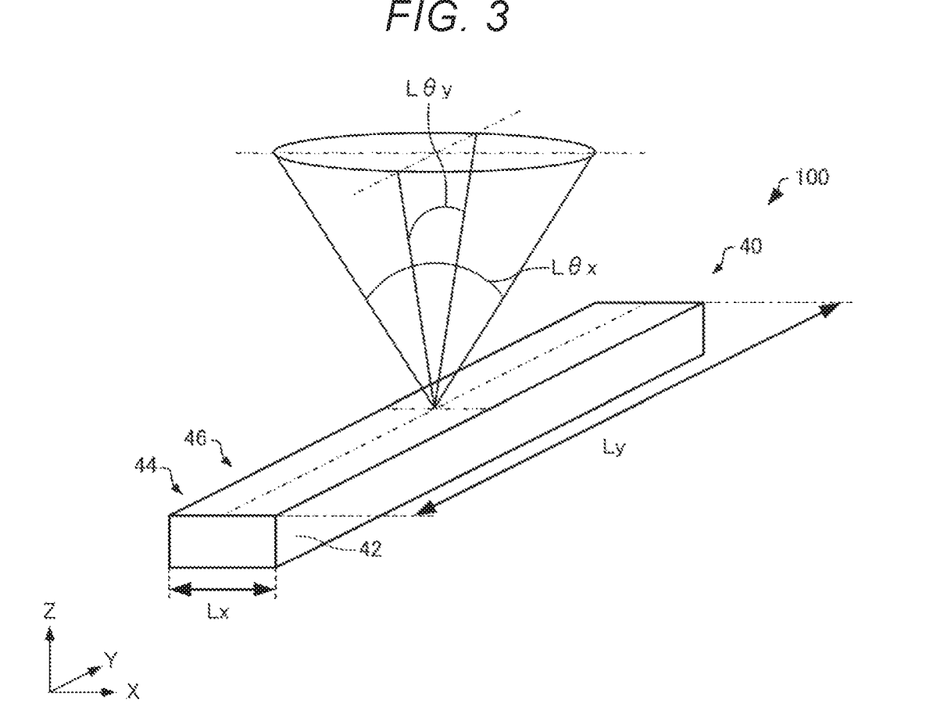
FIG. 3 is a perspective view schematically showing a light emitting element of the light source module according to the first embodiment.

As shown in FIG. 3, the light emitting element 40 has a resonator 44 constituted by a photonic crystal structure 42. The resonator 44 has a resonant part 46. The resonant part 46 is a part where the light resonates. It should be noted that the detailed structure of the light emitting element 40 will be described later.

In the plan view, the length Lx of the resonant part 46 in a first direction is shorter than the length Ly of the resonant part 46 in a third direction perpendicular to the first direction and a second direction. In the illustrated example, the first direction is the +X-axis direction. The second direction is the +Z-axis direction. The third direction is the +Y-axis direction. Since the length Lx is shorter than the length Ly, the light distribution angle Lθx in the X-axis direction becomes larger than the light distribution angle Lθy in the Y-axis direction in the light emitted from the light emitting element 40 as shown in FIG. 3. As described above, it is possible to check whether or not the length Lx is shorter than the length Ly based on the light distribution angle of the light emitted from the light emitting element 40.

In the illustrated example, the resonant part 46 is constituted by the photonic crystal structure 42, the length Lx of the resonant part 46 is the same as the length in the X-axis direction of the photonic crystal structure 42, and the length Ly of the resonant part 46 is the same as the length in the Y-axis direction of the photonic crystal structure 42. For example, in the plan view, out of a plurality of columnar parts (the columnar parts will be described later) constituting the photonic crystal structure 42, a distance between the center of the columnar part located the furthest in the +X-axis direction and the center of the columnar part located the furthest in the −X-axis direction is shorter than a distance between the center of the columnar part located the furthest in the +Y-axis direction and the center of the columnar part located the furthest in the −Y-axis direction. A surface on the +Z-axis direction side of the photonic crystal structure 42 is, for example, a light emission surface for emitting light.

As shown in FIG. 2, the light emitted from the light emitting elements 40 enters the polarization conversion elements 50. The light emitted from the light emitting elements 40 directly enters the polarization conversion elements 50 without intervention of an optical member. Thus, reduction in size of the light source module 100 can be achieved. In the example shown in FIG. 1, the planner shape in the X-Y plane of the polarization conversion element 50 is a rectangular shape having short sides in the X-axis direction and long sides in the Y-axis direction. The light emitted from the plurality of light emitting elements 40 enters, for example, one polarization conversion element 50.

Figure 4:
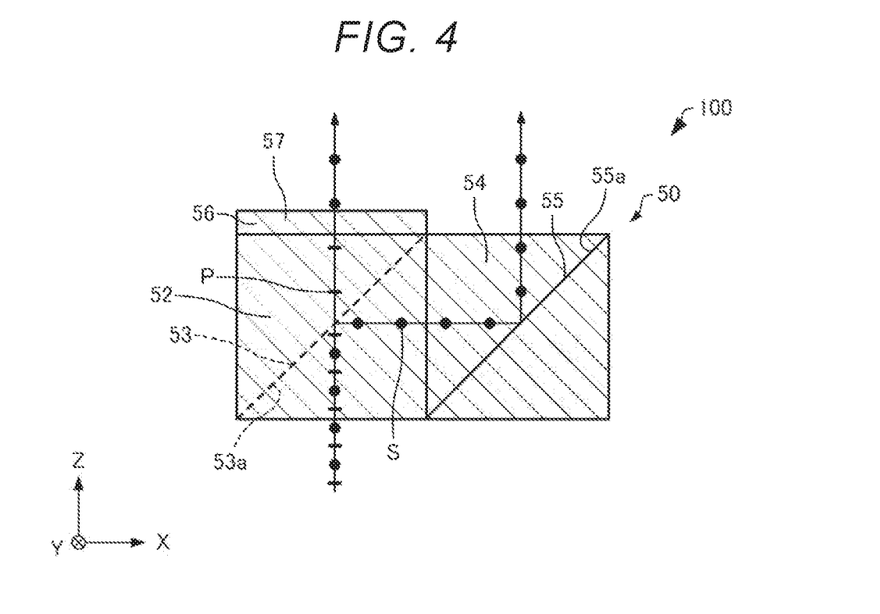
FIG. 4 is a cross-sectional view schematically showing a polarization conversion element of the light source module according to the first embodiment.
Figure 5:
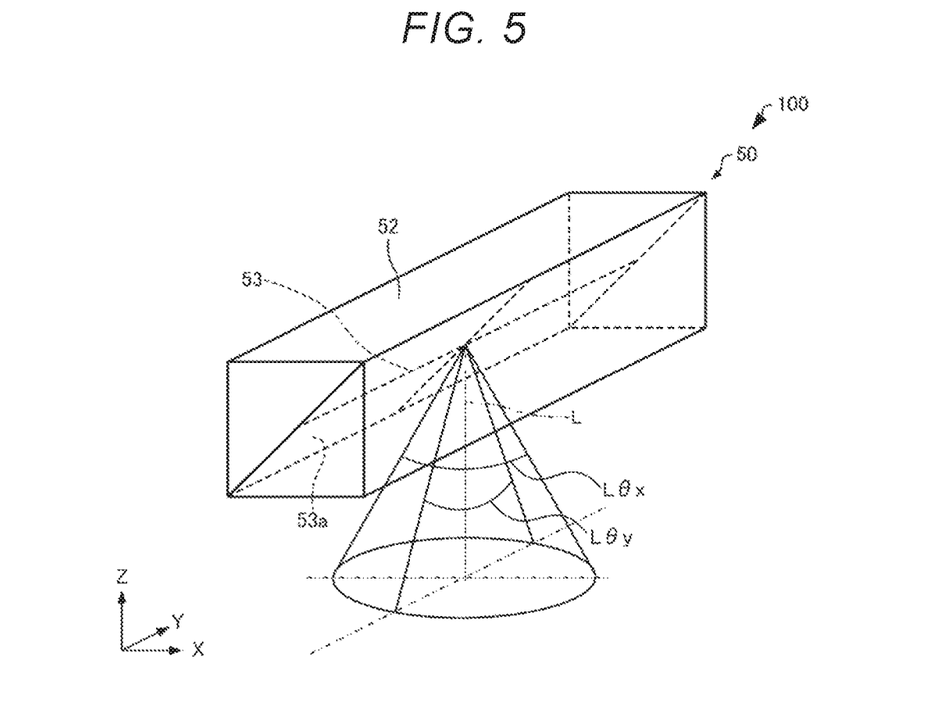
FIG. 5 is a perspective view schematically showing the polarization conversion element of the light source module according to the first embodiment.

The number of the polarization conversion elements 50 disposed is two or more. In the illustrated example, the plurality of polarization conversion elements 50 are arranged in the X-axis direction, and the polarization conversion elements 50 adjacent to each other are coupled to each other. The polarization conversion elements 50 adjacent to each other can be bonded to each other with an adhesive, for example. The plurality of polarization conversion elements 50 constitute a lid member 60 which covers an opening of a recessed part defined by the base member 10 and the frame member 20. The light emitting elements 40 are disposed in a space 2 formed by the base member 10, the lid member 60, and the frame member 20. The space 2 can be set as a nitrogen atmosphere. Here, FIG. 4 is a cross-sectional view schematically showing the polarization conversion element 50. FIG. 5 is a perspective view schematically showing the polarization conversion element 50.

As shown in FIG. 4, the polarization conversion element 50 has, for example, a polarization split element 52, a reflecting prism 54, and a polarization rotation element 56. It should be noted that in FIG. 5, illustration of the polarization split element 52 and the reflecting prism 54 is omitted for the sake of convenience. The polarization split element 52 is configured by disposing a polarization split layer 53 between tilted surfaces opposed to each other of a pair of triangular prisms (the X-Z cross-sectional shape is a right triangle), wherein the triangular prisms are each formed of a light transmissive material such as glass. The reflecting prism 54 is configured by disposing a reflecting layer 55 between tilted surfaces opposed to each other of a pair of triangular prisms (the X-Z cross-sectional shape is a right triangle), wherein the triangular prisms are each formed of a light transmissive material such as glass.

The polarization split element 52 has the polarization split layer 53. As shown in FIG. 4, the polarization split layer 53 has a polarization split surface 53a which reflects first polarized light out of the incident light toward the +X-axis direction, and transmits second polarized light out of the incident light toward the +Y-axis direction. In the example shown in FIG. 4, the first polarized light is the S-polarized light, and is represented by the filled circles. The second polarized light is the P-polarized light, and is represented by the crossbars. It should be noted that the first polarized light may be the P-polarized light, and the second polarized light may be the S-polarized light. The light emitted from the light emitting element 40 can be assumed as composite light of the S-polarized light and the P-polarized light. The polarization split layer 53 splits such composite light into the S-polarized light and the P-polarized light. The polarization split element 52 is a polarizing beam splitter (PBS).

The reflecting prism 54 has the reflecting layer 55. The reflecting layer 55 has a reflecting surface 55a, wherein the S-polarized light reflected by the polarization split layer 53 is reflected by the reflecting surface 55a toward the +Z-axis direction.

The polarization rotation element 56 has, for example, a retardation layer 57 formed of an organic film. The polarization rotation element 56 is formed of, for example, the retardation layer 57. The retardation layer 57 is disposed in a light path of one of the S-polarized light reflected by the reflecting layer 55 and the P-polarized light transmitted through the polarization split layer 53, and converts (converts one of the polarized light into the other of the polarized light) the polarization state of the polarized light transmitted through the retardation layer 57 to, for example, rotate the polarization direction as much as 90 degrees. In the illustrated example, the retardation layer 57 is disposed in the light path of the P-polarized light transmitted through the polarization split layer 53 to convert the P-polarized light into the S-polarized light. The polarization rotation element 56 is, for example, a λ/2 plate. Thus, it is possible for the polarization conversion element 50 to convert the incident light into the S-polarized light to emit the S-polarized light. Therefore, almost the whole of the light emitted from the polarization conversion element 50 is the S-polarized light, and thus, it is possible to emit the light high in polarization degree.

It should be noted that since the light distribution angle of the light emitted from the light emitting element 40 is narrow, by disposing the light emitting element 40 and the polarization conversion element closely to each other, it is possible to make almost whole of the light emitted from the light emitting element 40 enter the polarization conversion element 50.

As shown in FIG. 5, the polarization split characteristic of the polarization split layer 53 has anisotropic incident-angle dependency. In a plane of incidence (a plane parallel to the X-Z plane in the illustrated example) of the polarization split surface 53a of the polarization split layer 53, it is possible to reduce the incident-angle dependency with the characteristic of the polarization split layer 53. For example, by adjusting the material, the film thickness, and so on of an optical film constituting the polarization split layer 53, it is possible to efficiently perform the polarization split even when the light distribution angle is large in the plane parallel to the X-Z plane. In contrast, in a plane (a plane parallel to the Y-Z plane in the illustrated example) perpendicular to the plane of incidence, it is extremely difficult to reduce the incident-angle dependency with the characteristic of the polarization split layer 53. This is because when making the polarized light enter the Y-Z plane with an angle with an optical axis L, the polarization plane of the polarized light rotates in accordance with the incident angle. Therefore, in order to obtain a high polarization split characteristic in the polarization split layer 53, it is desirable for the light distribution angle to be narrow in the plane parallel to the Y-Z plane rather than in the plane parallel to the X-Z plane. In other words, L$\theta$y<L$\theta$x is desirable.

According to the above, considering the fact that the light resonated in the resonant part 46 having a rectangular shape in, for example, the plan view and then emitted has the anisotropy in the light distribution angle, and the fact that the polarization split characteristic of the polarization split layer 53 has the anisotropic incident-angle dependency, by making a direction along the plane of incidence of the polarization split surface 53a of the polarization split layer 53 and a direction in which the light distribution angle increases coincide with each other, it is possible to enhance the polarization conversion efficiency in the polarization conversion element 50.

1.1.2. Light Emitting Element

Figure 6:
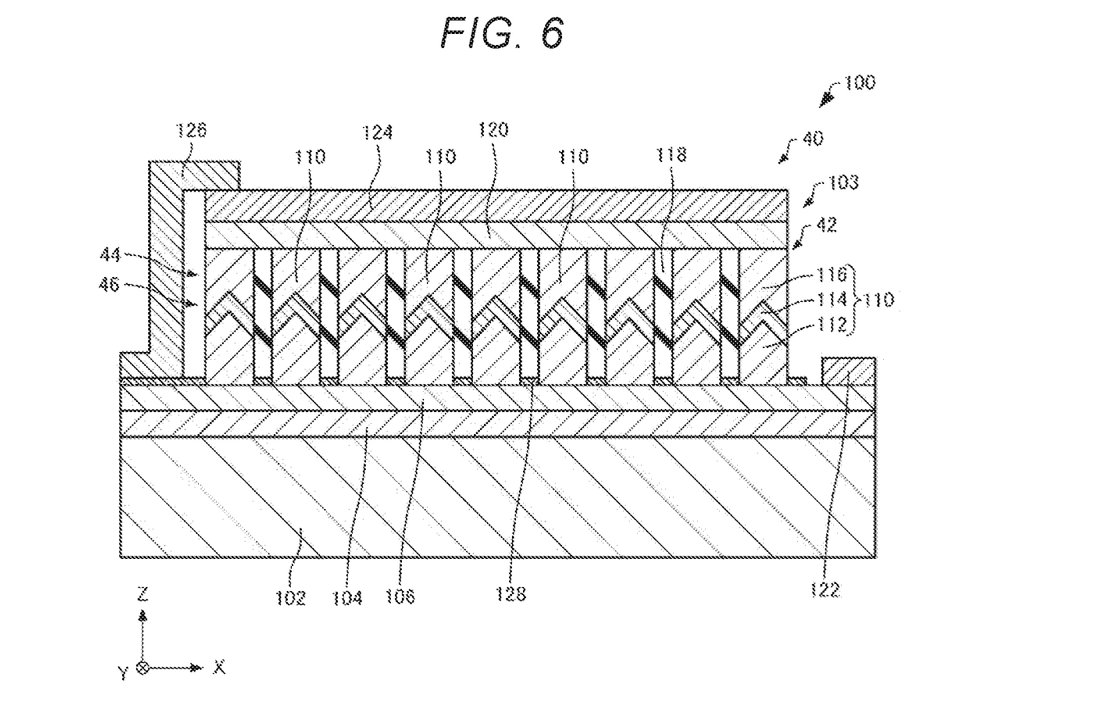
FIG. 6 is a cross-sectional view schematically showing the light emitting element of the light source module according to the first embodiment.

Then, a configuration of the light emitting element 40 will be described. FIG. 6 is a cross-sectional view schematically showing the light emitting element 40.

As shown in FIG. 6, the light emitting element 40 has, for example, a substrate 102, a stacked body 103 disposed on the substrate 102, a first electrode 122, a second electrode 124, and an interconnection 126. The stacked body 103 has a reflecting layer 104, a buffer layer 106, the photonic crystal structure 42, and a semiconductor layer 120. It should be noted that in FIG. 1 through FIG. 3, the light emitting elements 40 are illustrated in a simplified manner for the sake of convenience.

The substrate 102 is, for example, an Si substrate, a GaN substrate, or a sapphire substrate.

The reflecting layer 104 is disposed on the substrate 102. The reflecting layer 104 is, for example, a DBR (distributed Bragg reflector) layer. The reflecting layer 104 is, for example, what is obtained by alternately stacking AlGaN layers and GaN layers on one another or what is obtained by alternately stacking AlInN layers and GaN layers on one another. The light generated by a light emitting layer 114 of each of columnar parts 110 of the photonic crystal structure 42 is reflected by the reflecting layer 104 toward the second electrode 124.

It should be noted that in the present specification, when taking the light emitting layer 114 as a reference in the stacking direction (hereinafter also referred to simply as a "stacking direction") of the stacked body 103, the description will be presented assuming a direction from the light emitting layer 114 toward a semiconductor layer 116 as an "upward direction," and a direction from the light emitting layer 114 toward a semiconductor layer 112 as a "downward direction." Further, the "stacking direction of the stacked body" denotes a stacking direction of the semiconductor layer 112 and the light emitting layer 114.

The buffer layer 106 is disposed on the reflecting layer 104. The buffer layer 106 is a layer made of semiconductor such as an Si-doped n-type GaN layer. In the illustrated example, on the buffer layer 106, there is disposed a mask layer 128 for growing the columnar parts 110. The mask layer 128 is, for example, a silicon oxide layer or a silicon nitride layer.

The photonic crystal structure 42 is disposed on the buffer layer 106. The photonic crystal structure 42 has, for example, the columnar parts 110 and light propagation layers 118.

The photonic crystal structure 42 can develop an effect of the photonic crystal, and confines the light emitted by the light emitting layers 114 of the photonic crystal structure 42 in an in-plane direction of the substrate 102, and then emits the light toward the stacking direction. Here, the "in-plane direction of the substrate 102" denotes a direction perpendicular to the stacking direction. The light emitting element 40 is a photonic crystal light emitting element having the photonic crystal structure 42.

The columnar parts 110 are disposed on the buffer layer 106. The planar shape in the X-Y plane of the columnar part 110 is a polygonal shape such as a regular hexagon, a circle, or the like. The diametrical size of the columnar part 110 is, for example, in a nanometer-order range, and is specifically no smaller than 10 nm and no larger than 500 nm. The size in the stacking direction of the columnar part 110 is, for example, no smaller than 0.1 μm and no larger than 5 μm.

It should be noted that when the planar shape of the columnar part 110 is a circle, the "diametrical size" denotes the diameter of the circle, and when the planar shape of the columnar part 110 is not a circle, the "diametrical size" denotes the diameter of a minimum enclosing circle. For example, when the planar shape of the columnar part 110 is a polygonal shape, the diametrical size of the columnar part 110 is the diameter of a minimum circle including the polygonal shape inside, and when the planar shape of the columnar part 110 is an ellipse, the diametrical size of the columnar part 110 is the diameter of a minimum circle including the ellipse inside. Further, when the planar shape of the columnar part 110 is a circle, the "center of the columnar part 110" denotes the center of the circle, and when the planar shape of the columnar part 110 is not a circle, the "center of the columnar part 110" denotes the center of the minimum enclosing circle. For example, when the planar shape of the columnar part 110 is a polygonal shape, the center of the columnar part 110 is the center of a minimum circle including the polygonal shape inside, and when the planar shape of the columnar part 110 is an ellipse, the center of the columnar part 110 is the center of a minimum circle including the ellipse inside.

The number of the columnar parts 110 disposed is more than one. An interval between the columnar parts 110 adjacent to each other is, for example, no smaller than 1 nm and no larger than 500 nm. The columnar parts 110 are periodically disposed in a predetermined direction at a predetermined pitch. The plurality of columnar parts 110 are disposed so as to form, for example, a triangular lattice, a quadrangular lattice, or a square lattice when viewed from the stacking direction. The pitch of the columnar parts 110 mentioned here is a distance between the centers of the columnar parts 110 adjacent to each other.

The columnar parts 110 each have the semiconductor layer 112, the light emitting layer 114, and the semiconductor layer 116.

The semiconductor layer 112 is disposed on the buffer layer 106. The semiconductor layer 112 is, for example, the Si-doped n-type GaN layer.

The light emitting layer 114 is disposed on the semiconductor layer 112. The light emitting layer 114 is disposed between the semiconductor layer 112 and the semiconductor layer 116. The light emitting layer 114 has a quantum well structure constituted by, for example, a GaN layer and an InGaN layer. The light emitting layer 114 is a layer capable of emitting light in response to injection of an electrical current.

The semiconductor layer 116 is disposed on the light emitting layer 114. The semiconductor layer 116 is a layer different in conductivity type from the semiconductor layer 112. The semiconductor layer 116 is, for example, an Mg-doped p-type GaN layer. The semiconductor layers 112, 116 are cladding layers having a function of confining the light in the light emitting layer 114.

The light propagation layer 118 is disposed between the columnar parts 110 adjacent to each other. In the illustrated example, the light propagation layers 118 are disposed on the mask layer 128. The refractive index of the light propagation layer 118 is lower than, for example, the refractive index of the light emitting layer 114. The light propagation layer 118 is, for example, a silicon oxide layer, an aluminum oxide layer, or a titanium oxide layer. The light generated in the light emitting layer 114 can propagate through the light propagation layer 118.

In the light emitting element 40, the p-type semiconductor layer 116, the light emitting layer 114 with no impurity doped, and the n-type semiconductor layer 112 constitute a pin diode. The semiconductor layers 112, 116 are layers larger in bandgap than the light emitting layer 114. In the light emitting element 40, when applying a forward bias voltage of the pin diode between the first electrode 122 and the second electrode 124 to inject a current, there occurs recombination of electrons and holes in the light emitting layer 114. The recombination causes light emission. The light generated in the light emitting layer 114 propagates through the light propagation layer 118 in the in-plane direction of the substrate 102 due to the semiconductor layers 112, 116 to form a standing wave due to the effect of the photonic crystal in the photonic crystal structure 42, and is confined in the in-plane direction of the substrate 102. The light thus confined causes laser oscillation with the gain in the light emitting layer 114. In other words, the light generated in the light emitting layer 114 resonates in the in-plane direction of the substrate 102 due to the photonic crystal structure 42 to cause the laser oscillation. Specifically, the light generated in the light emitting layer 114 resonates in the in-plane direction of the substrate 102 in the resonant part 46 of the resonator 44 constituted by the photonic crystal structure 42 to cause the laser oscillation. Then, positive first-order diffracted light and negative first-order diffracted light proceed in the stacking direction as a laser beam.

The laser beam proceeding toward the reflecting layer 104 out of the laser beam having proceeded in the stacking direction is reflected by the reflecting layer 104, and proceeds toward the second electrode 124. Thus, it is possible for the light emitting element 40 to emit the light from the second electrode 124 side.

The semiconductor layer 120 is disposed on the photonic crystal structure 42. The semiconductor layer 120 is, for example, an Mg-doped p-type GaN layer.

The first electrode 122 is disposed on the buffer layer 106. It is also possible for the buffer layer 106 to have ohmic contact with the first electrode 122. In the illustrated example, the first electrode 122 is electrically coupled to the semiconductor layer 112 via the buffer layer 106. The first electrode 122 is one of the electrodes for injecting the electrical current into the light emitting layer 114. As the first electrode 122, there is used, for example, what is obtained by stacking a Ti layer, an Al layer, and an Au layer in this order from the buffer layer 106 side.

The second electrode 124 is disposed on the semiconductor layer 120. It is also possible for the semiconductor layer 120 to have ohmic contact with the second electrode 124. The second electrode 124 is electrically coupled to the semiconductor layer 116. In the illustrated example, the second electrode 124 is electrically coupled to the semiconductor layer 116 via the semiconductor layer 120. The second electrode 124 is the other of the electrodes for injecting the electrical current into the light emitting layer 114. As the second electrode 124, there is used, for example, ITO (Indium Tin Oxide).

The interconnection 126 is coupled to the second electrode 124. The interconnection 126 is electrically separated from the buffer layer 106. The material of the interconnection 126 is, for example, copper, aluminum, or gold.

It should be noted that although the light emitting layer 114 of the InGaN type is described above, as the light emitting layer 114, there can be used any types of material capable of emitting light in response to an electrical current injected in accordance with the wavelength of the light to be emitted. It is possible to use semiconductor materials of, for example, an AlGaN type, an AlGaAs type, an InGaAs type, an InGaAsP type, an InP type, a GaP type, or an AlGaP type. Further, it is also possible to change the size and the pitch of the arrangement of the columnar parts 110 in accordance with the wavelength of the light to be emitted.

Further, although the photonic crystal structure 42 has the columnar parts 110 disposed periodically in the above description, it is also possible to have hole parts disposed periodically in order to develop the photonic crystal effect.

Then, a method of manufacturing the light emitting element 40 will be described.

As shown in FIG. 6, the reflecting layer 104 and the buffer layer 106 are grown epitaxially on the substrate 102 in this order. As the method of achieving the epitaxial growth, there can be cited, for example, an MOCVD (Metal Organic Chemical Vapor Deposition) method and an MBE (Molecular Beam Epitaxy) method.

Then, the mask layer 128 is formed on the buffer layer 106 using the MOCVD method or the MBE method. Then, the semiconductor layer 112, the light emitting layer 114, and the semiconductor layer 116 are grown epitaxally on the buffer layer 106 in this order using the mask layer 128 as a mask. As the method of achieving the epitaxial growth, there can be cited, for example, the MOCVD method and the MBE method. Due to the present process, it is possible to form the columnar parts 110. Then, the light propagation layers 118 are formed between the columnar parts 110 adjacent to each other using a spin coat method or the like. Due to the present process, it is possible to form the photonic crystal structure 42.

Then, the semiconductor layer 120 is formed on the columnar parts 110 and the light propagation layers 118 using, for example, the MOCVD method or the MBE method.

Subsequently, the first electrode 122 and the second electrode 124 are formed using, for example, a vacuum evaporation method. Then, the interconnection 126 is formed using, for example, a sputtering method or a plating method.

Due to the process described hereinabove, it is possible to manufacture the light emitting elements 40.

1.1.3. Advantages

The light source module 100 has, for example, the following advantages.

In the light source module 100, there are provided at least one light emitting element 40 having the resonator formed of the photonic crystal structure 42, and the polarization conversion element 50 which the light emitted from the light emitting element 40 enters. The polarization conversion element 50 has the polarization split layer 53, the reflecting layer 55, and the retardation layer 57, wherein the polarization split layer 53 reflects the S-polarized light out of the incident light toward the +X-axis direction, and transmits the P-polarized light out of the incident light toward the +Z-axis direction, the S-polarized light reflected by the polarization split layer 53 is reflected by the reflecting layer 55 toward the +Z-axis direction, the retardation layer 57 is disposed in the light path of the P-polarized light transmitted through the polarization split layer 53, and converts the P-polarized light into the S-polarized light. The resonator 44 has the resonant part 46, and the length Lx of the resonant part 46 in the +X-axis direction is shorter than the length Ly of the resonant part 46 in the +Y-axis direction in the plan view.

Therefore, in the light source module 100, as described above, in the light emitted from the light emitting element 40, the light distribution angle in the X-axis direction becomes larger than the light distribution angle in the Y-axis direction. Thus, it is possible to match the direction along the plane of incidence (the X-Z plane in the illustrated example) of the polarization split surface 53a of the polarization split layer 53 and the direction in which the light distribution angle increases each other. As described above, in the direction along the plane of incidence of the polarization split surface 53a of the polarization split layer 53, the incident-angle dependency can be reduced with the characteristic of the polarization split layer 53. Therefore, in the light source module 100, the S-polarized light and the P-polarized light can correctly be separated from each other in the polarization split layer 53 compared to when the direction along the plane of incidence of the polarization split surface 53a and the direction in which the light distribution angle increases fail to be matched each other. Therefore, in the light source module 100, it is possible to emit the light high in polarization degree.

In the light source module 100, there are disposed the plurality of light emitting elements 40, and the light emitted from the plurality of light emitting elements 40 enters the polarization conversion elements 50. Therefore, in the light source module 100, since the length of the outer circumferential sides to the area of the resonant part 46 is longer compared to when only the light emitted from one light emitting element 40 enters one polarization conversion element 50, and thus it becomes easy for the light emitting elements 40 to release the heat, it is possible to increase the intensity of the light emitted from the polarization conversion elements 50. In the plan view, for example, the polarization split layer 53 of the polarization conversion element 50 has a rectangular shape having the longitudinal direction in the Y-axis direction, and by arranging the plurality of light emitting elements 40 side by side in the Y-axis direction, it is possible to make the light efficiently enter the polarization conversion elements 50. Further, since, for example, the light emitting elements 40 each have a rectangular shape having the short sides in the X-axis direction in the plan view, it is possible to decrease the pitch in the X-axis direction of the polarization split layer 53, and thus, it is possible to achieve reduction in size of the light source module 100.

In the light source module 100, the polarization conversion elements 50 constitute the lid member 60. Therefore, in the light source module 100, it is possible to achieve reduction in size compared to when the polarization conversion elements 50 and the lid member 60 are separate members.

1.2. Modified Example of Light Source Module

Figure 7:
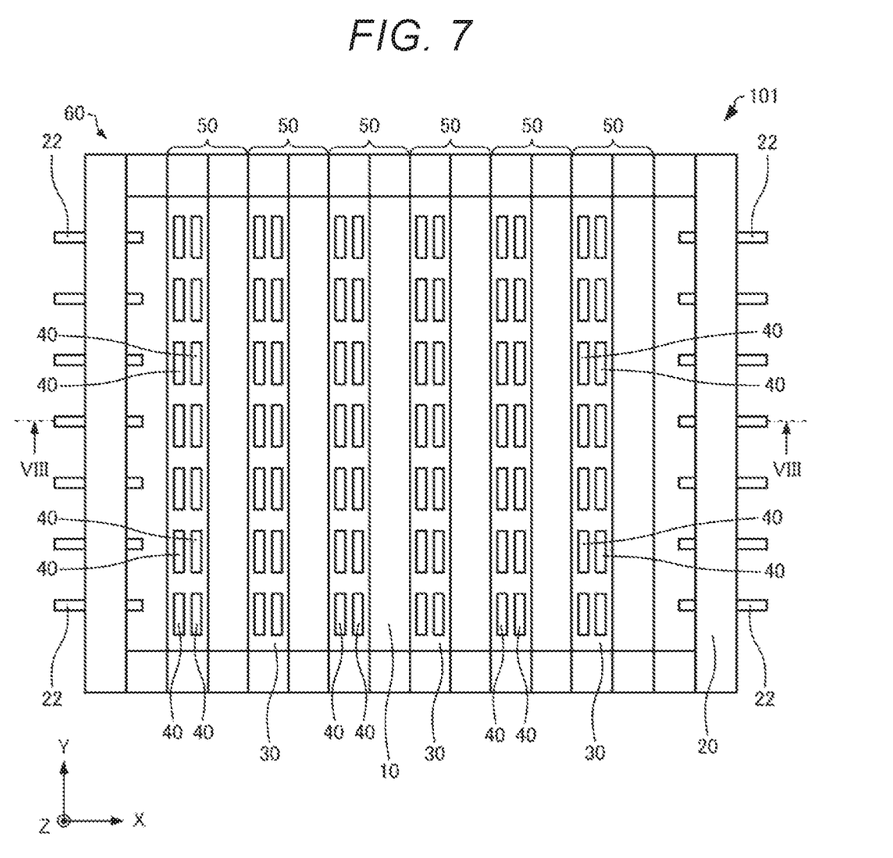
FIG. 7 is a plan view schematically showing a light source module according to a modified example of the first embodiment.
Figure 8:
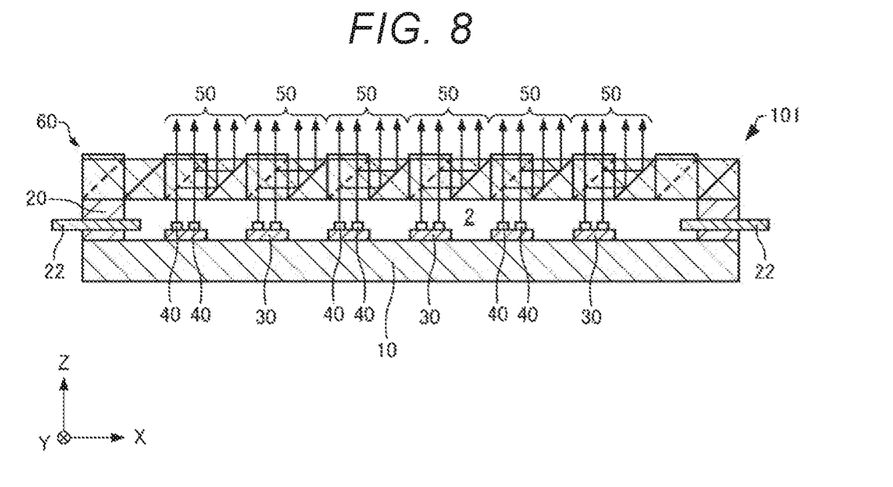
FIG. 8 is a cross-sectional view schematically showing the light source module according to the modified example of the first embodiment.

Then, a light source module 101 according to a modified example of the first embodiment will be described with reference to the drawings. FIG. 7 is a plan view schematically showing the light source module 101 according to the modified example of the first embodiment. FIG. 8 is a cross-sectional view along the line VIII-VIII shown in FIG. 7 schematically showing the light source module 101 according to the modified example of the first embodiment.

Hereinafter, in the light source module 101 according to the modified example of the first embodiment, the members having substantially the same functions as those of the constituent members of the light source module 100 according to the first embodiment described above will be denoted by the same reference symbols, and detailed descriptions thereof will be omitted.

As shown in FIG. 7 and FIG. 8, the light source module 101 is different from the light source module 100 described above in the point that the plurality of light emitting elements 40 are arranged in the X-axis direction in each of the sub-mounts 30.

In the illustrated example, the two light emitting elements 40 are arranged in the X-axis direction in each of the sub-mounts 30. In the illustrated example, the plurality of light emitting elements 40 are not arranged at an equal pitch in the X-axis direction, but are arranged so that the intervals partially decrease. Thus, it is possible to achieve reduction in size compared to when, for example, arranging the plurality of light emitting elements 40 at an equal pitch in the X-axis direction.

It is preferable for the size in the X-axis direction of the polarization split elements 52 to be no smaller than 1 mm. When the size is smaller than 1 mm, it becomes difficult to achieve the alignment with the retardation layer 57, and thus, rise in manufacturing cost and degradation in polarization conversion efficiency are apt to be incurred.

2. Second Embodiment 2.1. Light Source Module

Figure 9:
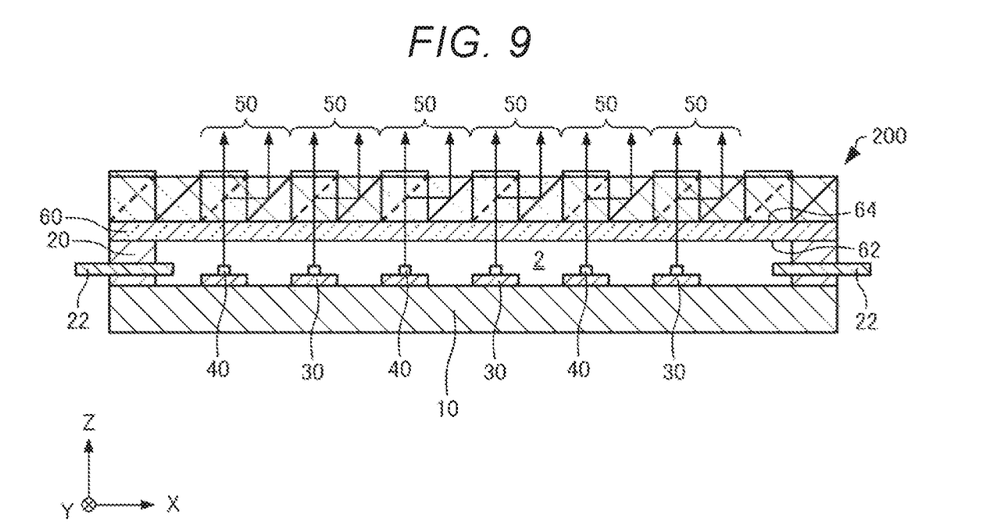
FIG. 9 is a cross-sectional view schematically showing a light source module according to a second embodiment.

Then, a light source module 200 according to a second embodiment will be described with reference to the drawings. FIG. 9 is a cross-sectional view schematically showing the light source module 200 according to the second embodiment.

Hereinafter, in the light source module 200 according to the second embodiment, the members having substantially the same functions as those of the constituent members of the light source module 100 according to the first embodiment described above will be denoted by the same reference symbols, and detailed descriptions thereof will be omitted.

As shown in FIG. 2, in the light source module 100 described above, the lid member 60 is constituted by the plurality of polarization conversion elements 50.

In contrast, in the light source module 200, the lid member 60 is formed of a light transmissive substrate which transmits the light emitted from the light emitting elements 40 as shown in FIG. 9. Therefore, it is possible to enhance the airtightness of the space 2 compared to when constituting the lid member 60 by, for example, the plurality of polarization conversion elements 50.

The lid member 60 has a first surface 62 and a second surface 64. The first surface 62 is a surface defining the space 2, and is a surface on the light emitting element 40 side. The second surface 64 is a surface on the opposite side to the light emitting elements 40. The polarization conversion elements 50 are disposed on the second surface 64. The polarization conversion elements 50 can adhere to the second surface 64. The lid member 60 is disposed between the light emitting elements 40 and the polarization conversion elements 50. The light emitted from the light emitting elements 40 is transmitted through the lid member 60, and then enters the polarization conversion elements 50.

The thermal conductivity of the lid member 60 can be higher than the thermal conductivity of the polarization conversion elements 50. Thus, it is possible to promptly release the heat generated in the polarization conversion elements 50 to enhance the durability of the polarization conversion elements 50. The light transmissive substrate constituting the lid member 60 can be a sapphire substrate.

The light transmissive substrate constituting the lid member 60 can also be a depolarization plate for dissolving the polarization. When the light emitted from the light emitting element is light low in polarization degree, or significantly different in polarization degree by the emission position, the intensity of the light emitted significantly varies by the emission position in the light source module. In such a light source module, a significant intensity variation occurs in the light to be emitted as a result, which is apt to cause the degradation in the illumination quality.

Therefore, the depolarization plate is disposed between the light emitting elements 40 and the polarization conversion elements 50. The light having entered the depolarization plate is emitted as unpolarized light. The "unpolarized light" is the same in meaning as the light having random polarization directions. By converting the unpolarized light emitted from the depolarization plate in the polarization conversion element 50, it is possible to emit the light small in intensity variation from the light source module 200. Thus, it is possible to enhance the illumination quality.

As the depolarization plate, there can be used, for example, a pair of quartz crystal substrates having a wedge shape, what has microscopic structures (Sub-Wavelength Structures) with a sub-wavelength pitch on a surface of a light transmissive member, and what is obtained by dispersing optically active crystals in a light transmissive medium having substantially the same refractive index.

It is possible to dispose a λ/4 plate instead of the depolarization plate. Thus, it is possible to achieve the conversion into a variety of types of polarized light such as elliptically-polarized light or circularly polarized light instead of unpolarized light, and it is possible to obtain similar advantages to those obtained when using the depolarization plate.

2.2. Modified Example of Light Source Module

Figure 10:
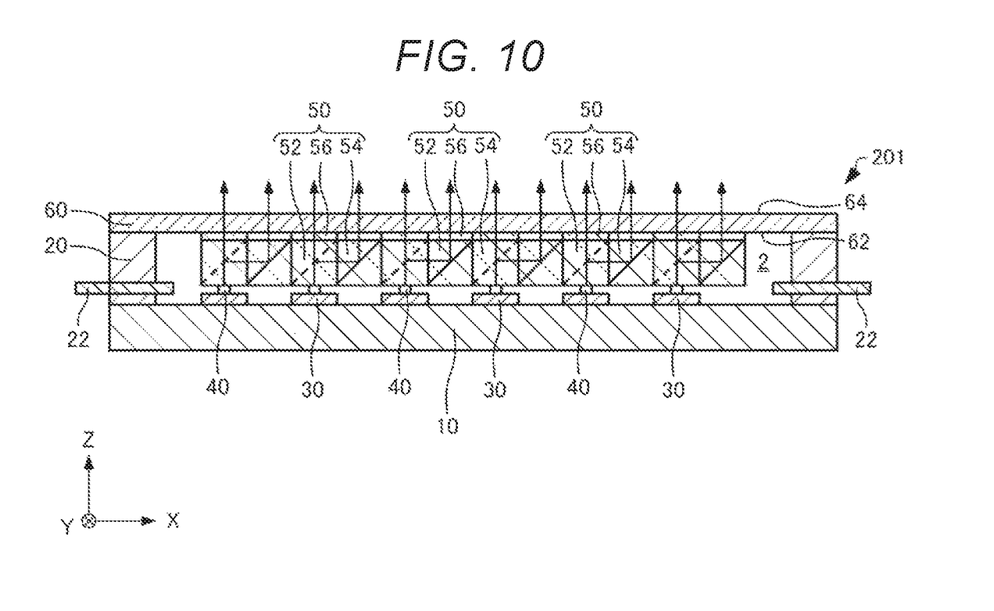
FIG. 10 is a cross-sectional view schematically showing a light source module according to a modified example of the second embodiment.

Then, a light source module 201 according to a modified example of the second embodiment will be described with reference to the drawings. FIG. 10 is a cross-sectional view schematically showing the light source module 201 according to the modified example of the second embodiment.

Hereinafter, in the light source module 201 according to the modified example of the second embodiment, the members having substantially the same functions as those of the constituent members of the light source module 200 according to the second embodiment described above will be denoted by the same reference symbols, and detailed descriptions thereof will be omitted.

As shown in FIG. 9, in the light source module 200 described above, the polarization conversion elements 50 are disposed on the second surface 64 of the lid member 60. In contrast, as shown in FIG. 10, in the light source module 201, the polarization conversion elements 50 are disposed on the first surface 62 of the lid member 60. The polarization conversion elements 50 can adhere to the first surface 62. The polarization conversion elements 50 are disposed in the space 2. Therefore, when, for example, the space 2 is set as a nitrogen atmosphere, it is possible to prevent the deterioration of an adhesive with which the polarization conversion elements 50 adjacent to each other are bonded to each other.

In the illustrated example, the light emitting elements 40 and the polarization conversion elements 50 have contact with each other. Therefore, it is easy to release the heat generated in the light emitting elements 40 compared to when, for example, the light emitting elements 40 and the polarization conversion elements 50 are separated from each other.

Figure 11:
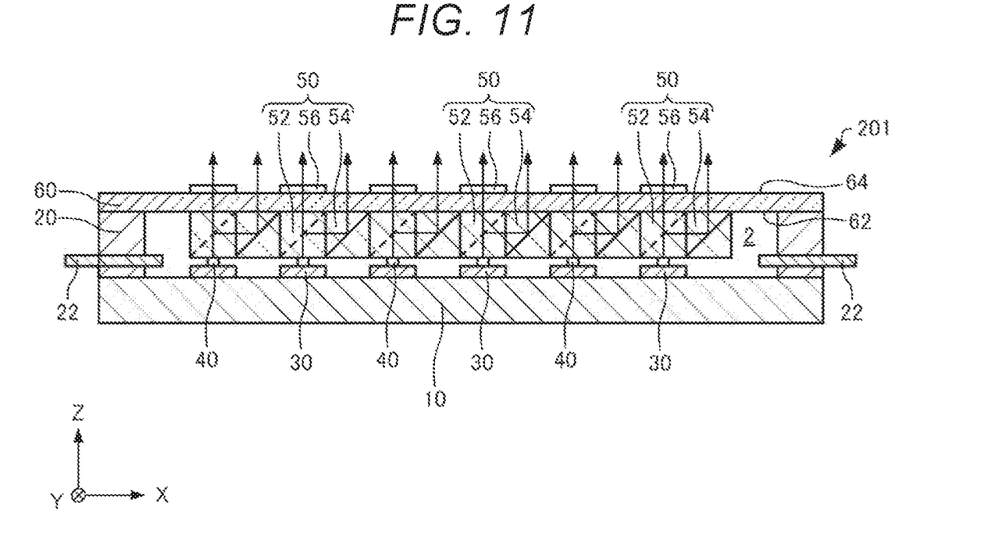
FIG. 11 is a cross-sectional view schematically showing the light source module according to the modified example of the second embodiment.

It should be noted that it is also possible to dispose the polarization split elements 52 and the reflecting prisms 54 on the first surface 62 of the lid member 60, and to dispose the polarization rotation elements 56 on the second surface 64 of the lid member 60 as shown in FIG. 11.

3. Third Embodiment

Figure 12:
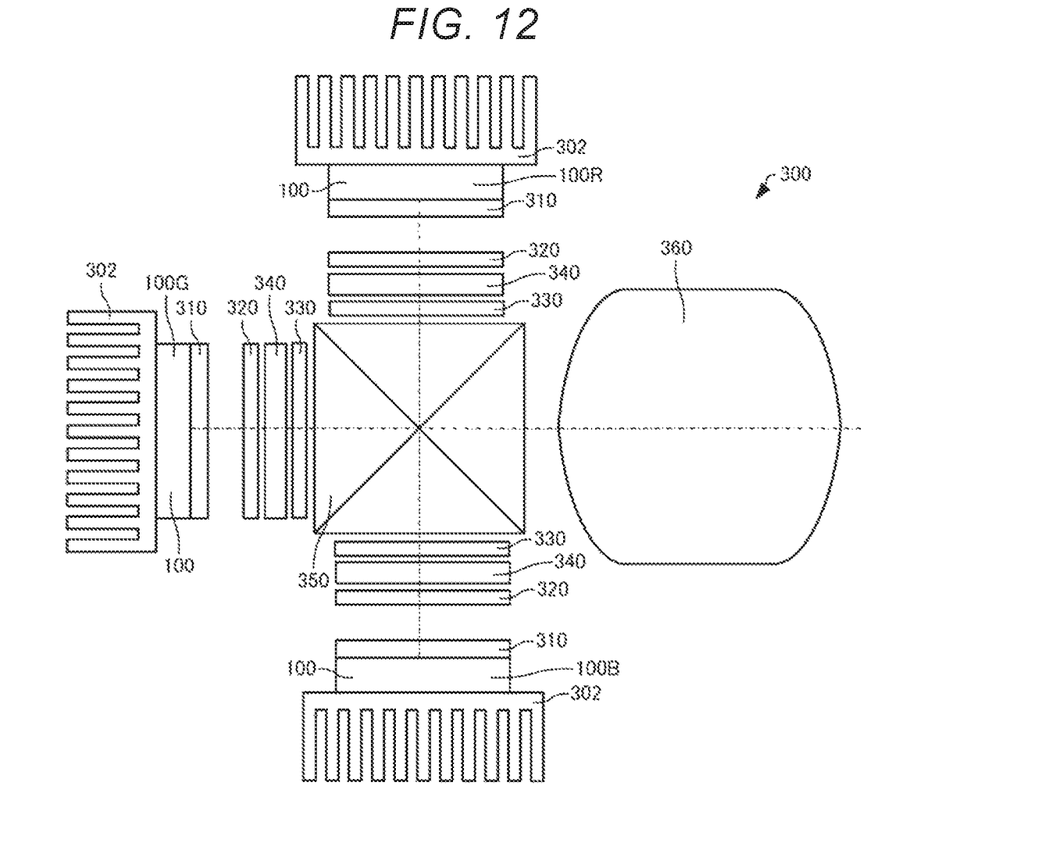
FIG. 12 is a diagram schematically showing a projector according to a third embodiment.

Then, a projector according to a third embodiment will be described with reference to the drawings. FIG. 12 is a diagram schematically showing a projector 300 according to the third embodiment.

As shown in FIG. 12, the projector 300 has, for example, light source modules 100R, 100G, and 100B, diffusion elements 310, first polarization plates 320, second polarization plates 330, light modulation elements 340, a colored light combining prism 350, and a projection lens 360. It should be noted that in FIG. 12, the light source modules 100R, 100G, and 100B are illustrated in a simplified manner for the sake of convenience.

The light source module 100R emits red light. The light source module 100G emits green light. The light source module 100B emits blue light. The light source modules 100R, 100G, and 100B are each, for example, the light source module 100. In the illustrated example, on one surface of each of the light source modules 100R, 100G, and 100B, there is disposed a radiator fin 302. The radiator fins 302 radiate the heat generated in the light source modules 100R, 100G, and 100B. Thus, it is possible to suppress heating in the light source modules 100R, 100G, and 100B to enhance the luminous efficiency.

The light emitted from the light source modules 100R, 100G, and 100B enters the diffusion elements 310, respectively. The diffusion elements 310 homogenize the intensity distributions of the light emitted from the light source modules 100R, 100G, and 100B, respectively.

The light modulation elements 340 modulate the light emitted from the light source modules 100R, 100G, and 100B, respectively, in accordance with image information. The light modulation elements 340 are, for example, transmissive liquid crystal light valves for transmitting the light emitted from the light source modules 100R, 100G, and 100B, respectively. The projector 300 is an LCD (liquid crystal display) projector.

On the incident side of each of the light modulation elements 340, there is disposed the first polarization plate 320. The first polarization plates 320 adjust polarization directions and polarization degrees of the light emitted from the light source modules 100R, 100G, and 100B, respectively. Specifically, the first polarization plates 320 are each an optical element for transmitting only the linearly polarized light in a specific direction. Due to the first polarization plate 320, it is possible to more surely uniform the polarization direction of the light entering the light modulation element 340. It should be noted that when the polarization degree of the light emitted from the light source modules 100R, 100G, and 100B is sufficiently high, it is possible to adopt a configuration in which the first polarization plates 320 are not disposed.

On the exit side of each of the light modulation elements 340, there is disposed the second polarization plate 330. The second polarization plates 330 function as analyzers with respect to the light emitted from the light source modules 100R, 100B, and 100B, respectively. The light emitted from the second polarization plate 330 enters the colored light combining prism 350.

The colored light combining prism 350 combines the light emitted from the light source module 100R and then transmitted through the light modulation element 340, the light emitted from the light source module 100G and then transmitted through the light modulation element 340, and the light emitted from the light source module 100B and then transmitted through the light modulation element 340 with each other. The colored light combining prism 350 is, for example, a cross dichroic prism which is formed by bonding four rectangular prisms to each other, and is provided with a dielectric multilayer film for reflecting the red light and a dielectric multilayer film for reflecting the blue light disposed on the inside surfaces thereof.

The projection lens 360 projects the light combined by the colored light combining prism 350, namely image light formed by the light modulation elements 340, on a screen not shown. An enlarged image is displayed on the screen.

The projector 300 has the light source module 100 capable of emitting the light high in polarization degree, and can therefore have high light efficiency, and can achieve the high-intensity projection image.

It should be noted that although not shown in the drawings, the projector 300 can be an LCoS (Liquid Crystal on Silicon) projector having reflective liquid crystal light valves for reflecting the light emitted from the light source modules 100R, 100G, and 100B.

In the present disclosure, some of the constituents can be omitted, or the embodiments and the modified example can be combined with each other within a range in which the features and the advantages described in the specification are provided.

The present disclosure is not limited to the embodiments described above, but can further variously be modified. For example, the present disclosure includes substantially the same configuration as the configurations described in the embodiments. Substantially the same configuration denotes a configuration substantially the same in, for example, function, way, and result, or a configuration substantially the same in object and advantage. Further, the present disclosure includes configurations obtained by replacing a non-essential part of the configuration explained in the above description of the embodiments. Further, the present disclosure includes configurations providing the same functions and the same advantages or configurations capable of achieving the same object as that of the configurations explained in the description of the embodiments. Further, the present disclosure includes configurations obtained by adding a known technology to the configuration explained in the description of the embodiments.

What is claimed is:

1. A light source module comprising:
   a base;
   a plurality of photonic crystal light emitting elements disposed on the base, each of the plurality of photonic crystal light emitting elements having a resonator formed of a photonic crystal structure;
   a frame disposed at a periphery of the base, the frame having a side wall surrounding the plurality of photonic crystal light emitting elements in a plan view; and
   a polarization conversion element into which light emitted from the photonic crystal light emitting element enters, the polarization conversion element being disposed on the frame to house the plurality of photonic crystal light emitting elements in an inner space, the inner space being formed by the base, the frame, and the polarization conversion element,
   wherein the polarization conversion element includes:
      a polarization split layer configured to reflect first polarized light out of the entered light toward a first direction and transmit second polarized light out of the entered light toward a second direction perpendicular to the first direction;
      a reflecting layer configured to reflect the first polarized light, that is reflected by the polarization split layer, toward the second direction; and
      a retardation layer which is disposed in a light path of one of the first polarized light reflected by the reflecting layer and the second polarized light transmitted through the polarization split layer, and converts one of the first polarized light and the second polarized light into the other of the first polarized light and the second polarized light,
   wherein the resonator has a resonant part,
   in the plan view viewed from the second direction, a length of the resonant part in the first direction is shorter than a length of the resonant part in a third direction perpendicular to the first direction and the second direction,
   the resonant part is configured with a plurality of columnar structures extending along the second direction, each of the plurality of columnar structures has a light emitting layer,
   the plurality of light emitting layers in the plurality of columnar structures of the resonator constitute a light source for emitting the light toward the polarization conversion element, and
   the light emitted from each of the plurality of photonic crystal light emitting elements enters the polarization conversion element by traveling through only the inner space without having an optical element between each of the plurality of photonic crystal light emitting elements and the polarization conversion element.

2. A projector comprising:
   the light source module according to claim 1.

\* \* \* \* \*